United States Patent
Lefevre

(10) Patent No.: US 7,471,301 B2
(45) Date of Patent: Dec. 30, 2008

(54) METHOD AND SYSTEM ENABLING REAL TIME MIXING OF SYNTHETIC IMAGES AND VIDEO IMAGES BY A USER

(75) Inventor: Valentin Lefevre, Puteaux (FR)

(73) Assignee: Total Immersion, Suresne (FR)

( * ) Notice: Subject to any disclaimer, the term of this patent is extended or adjusted under 35 U.S.C. 154(b) by 545 days.

(21) Appl. No.: 10/522,429

(22) PCT Filed: Jul. 21, 2003

(86) PCT No.: PCT/FR03/50019

§ 371 (c)(1),
(2), (4) Date: Jan. 25, 2005

(87) PCT Pub. No.: WO2004/012445

PCT Pub. Date: Feb. 5, 2004

(65) Prior Publication Data

US 2006/0074921 A1    Apr. 6, 2006

(30) Foreign Application Priority Data

Jul. 24, 2002    (FR)    .................................. 02 09401

(51) Int. Cl.
*G09G 5/377*    (2006.01)
(52) U.S. Cl. ........................ 345/632; 345/581; 345/629; 707/100
(58) Field of Classification Search ................. 345/629, 345/632, 581; 707/100
See application file for complete search history.

(56) References Cited

U.S. PATENT DOCUMENTS

| | | | | |
|---|---|---|---|---|
| 5,227,863 A | * | 7/1993 | Bilbrey et al. | 348/578 |
| 5,513,854 A | * | 5/1996 | Daver | 700/91 |
| 5,764,317 A | * | 6/1998 | Sadovnik et al. | 349/5 |
| 5,781,174 A | * | 7/1998 | Uya et al. | 345/639 |
| 5,860,648 A | * | 1/1999 | Petermeier et al. | 273/108.2 |
| 5,889,550 A | * | 3/1999 | Reynolds | 348/139 |

(Continued)

FOREIGN PATENT DOCUMENTS

WO    WO-00/30040 A    5/2000

OTHER PUBLICATIONS

Gianpaolo U. Carraro, John T. Edmark, J. Robert Ensor; Techniques for handling video in virtual environments; Proceedings of the 25th annual conference on Computer graphics and interactive techniques SIGGRAPH '98.*

(Continued)

*Primary Examiner*—Kee M Tung
*Assistant Examiner*—Javid A Amini
(74) *Attorney, Agent, or Firm*—Fulbright & Jaworski LLP

(57) ABSTRACT

The invention concerns a method and a system for: (i) producing in a computer processing unit a flow of synthetic images, and (ii) tracing a scene by creating visual interactions between the synthetic image flow and at least one video image flow. The computer processing unit comprises: a motherboard, a graphics board for scene rendering and display, including a processor for accelerating 2D/3D processing, a work buffer and a texture memory, an acquisition means for acquiring in real time video images, in a video buffer. The specific rendering of the scene is carried out: by recopying the video buffer in a memory zone of the graphics board, by tracing the synthetic images in the work buffer.

26 Claims, 6 Drawing Sheets

U.S. PATENT DOCUMENTS

| | | | | |
|---|---|---|---|---|
| 6,348,953 | B1* | 2/2002 | Rybczynski | 348/584 |
| 6,417,857 | B2* | 7/2002 | Finger et al. | 345/505 |
| 6,549,681 | B1* | 4/2003 | Takiguchi et al. | 382/294 |
| 6,756,984 | B1* | 6/2004 | Miyagawa | 345/473 |
| 6,798,420 | B1* | 9/2004 | Xie | 345/554 |
| 6,987,876 | B2* | 1/2006 | Silber et al. | 382/152 |
| 7,098,888 | B2* | 8/2006 | Temkin et al. | 345/156 |
| RE39,345 | E* | 10/2006 | Katto | 375/240.28 |
| 7,162,528 | B1* | 1/2007 | Simonoff et al. | 709/229 |
| 7,236,172 | B2* | 6/2007 | Clavadetscher | 345/427 |
| 2002/0084996 | A1* | 7/2002 | Temkin et al. | 345/204 |
| 2003/0109306 | A1* | 6/2003 | Karmarkar | 463/40 |
| 2004/0017398 | A1* | 1/2004 | MacInnis et al. | 345/781 |
| 2004/0056874 | A1* | 3/2004 | MacInnis et al. | 345/660 |
| 2004/0070822 | A1* | 4/2004 | Shioda et al. | 359/372 |
| 2004/0254454 | A1* | 12/2004 | Kockro | 600/424 |
| 2005/0012759 | A1* | 1/2005 | Valmiki et al. | 345/629 |
| 2005/0203367 | A1* | 9/2005 | Ahmed et al. | 600/407 |

OTHER PUBLICATIONS

Understanding and constructing shared spaces with mixed-reality boundaries Steve Benford, Chris Greenhalgh, Gail Reynard, Chris Brown, Boriana Koleva Sep. 1998 ACM Transactions on Computer-Human Interaction (TOCHI), vol. 5 Issue 3 Publisher: ACM Press.*

Rapid modeling of animated faces from video images Zicheng Liu, Zhengyou Zhang, Chuck Jacobs, Michael Cohen Oct. 2000 Proceedings of the eighth ACM international conference on Multimedia Multimedia '00 Publisher: ACM Press.*

Model-based varying pose face detection and facial feature registration in video images Lixin Fan, Kah Kay Sung Oct. 2000 Proceedings of the eighth ACM international conference on Multimedia Multimedia '00 Publisher: ACM Press.*

Video Processing: Motion-based segmentation and contour-based classification of video objects Gerald Kühne, Stephan Richter, Markus Beier Oct. 2001 Proceedings of the ninth ACM international conference on Multimedia Multimedia '01 Publisher: ACM Press.*

Human Pacman: a sensing-based mobile entertainment system with ubiquitous computing and tangible interaction Adrian David Cheok, Siew Wan Fong, Kok Hwee Goh, Xubo Yang, Wei Liu, Farzam Farzbiz May 2003 NetGames '03: Proceedings of the 2nd workshop on Network and system support for games Publisher: ACM.*

Texture Mapping with Hard Constraints Eurographics 2001 / A.Chalmers and T.-M.Rhyne;vol. 20 (2001), No. 3; Ilya Eckstein; vitaly Surazhsky; Craig Gotsman.*

* cited by examiner

FIG_1
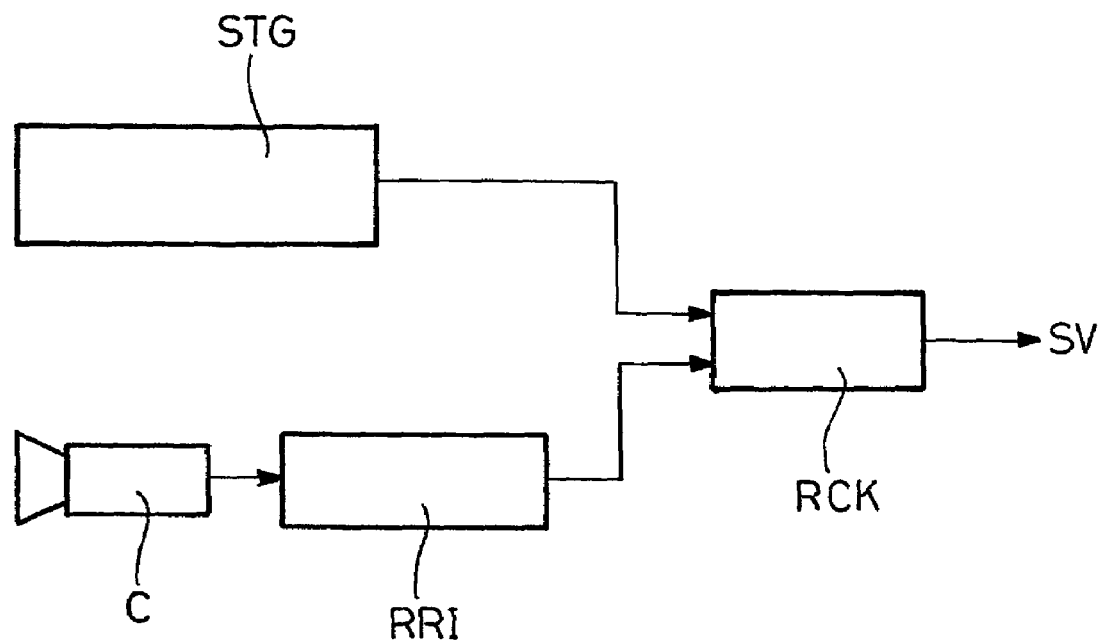

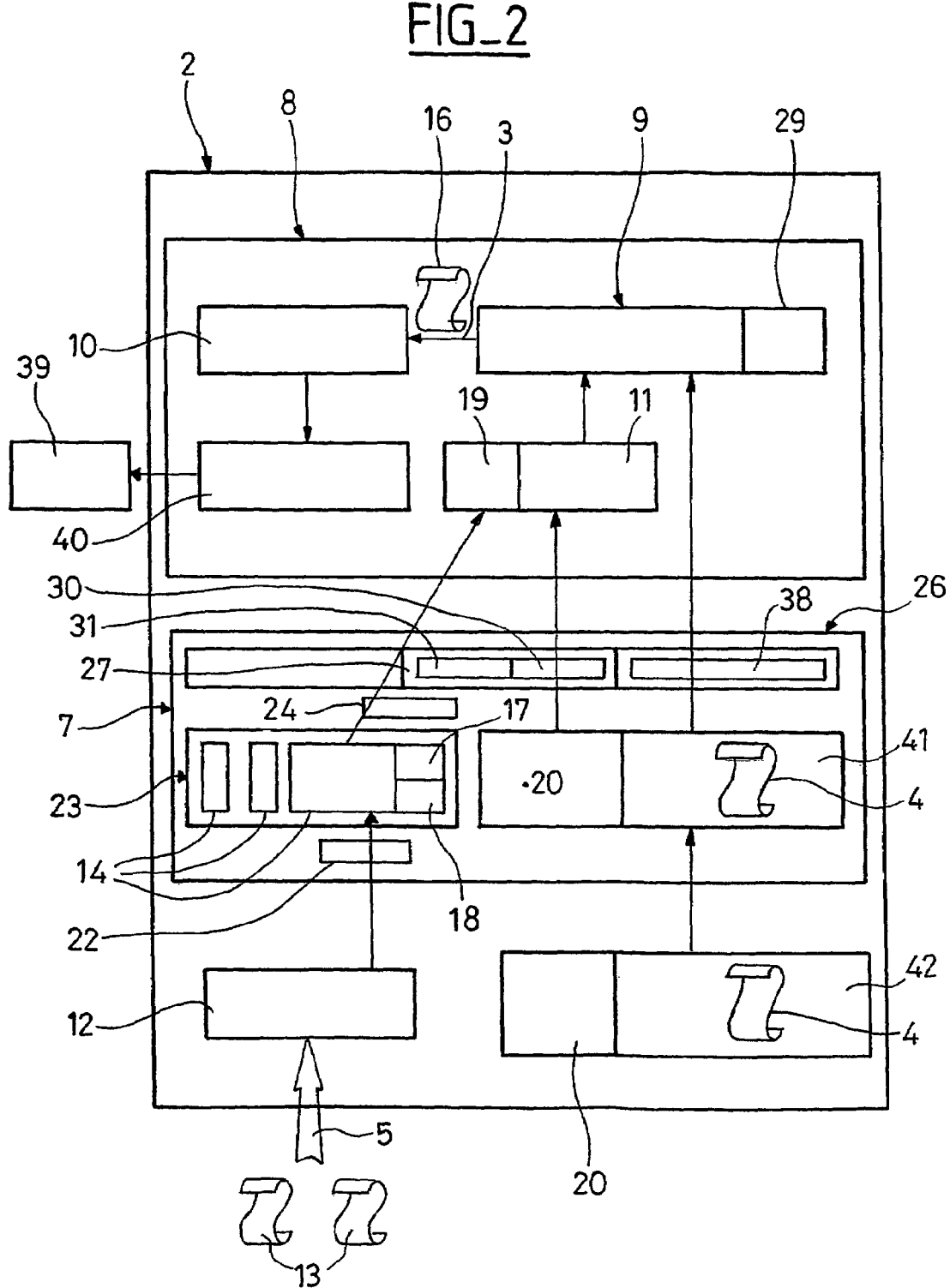

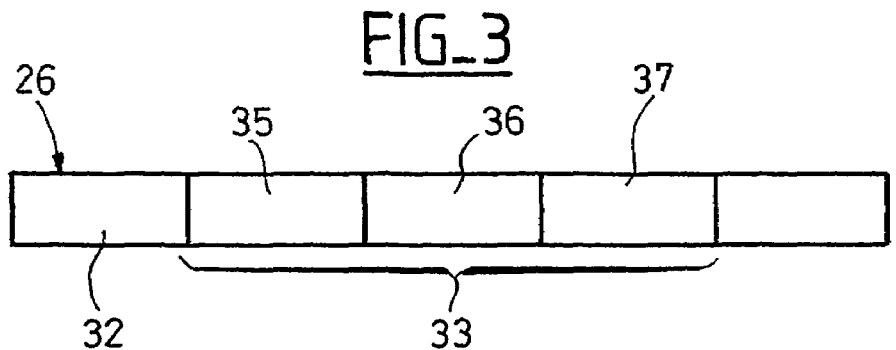
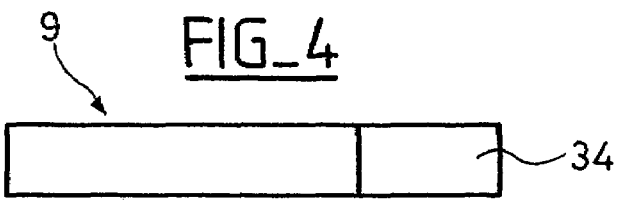
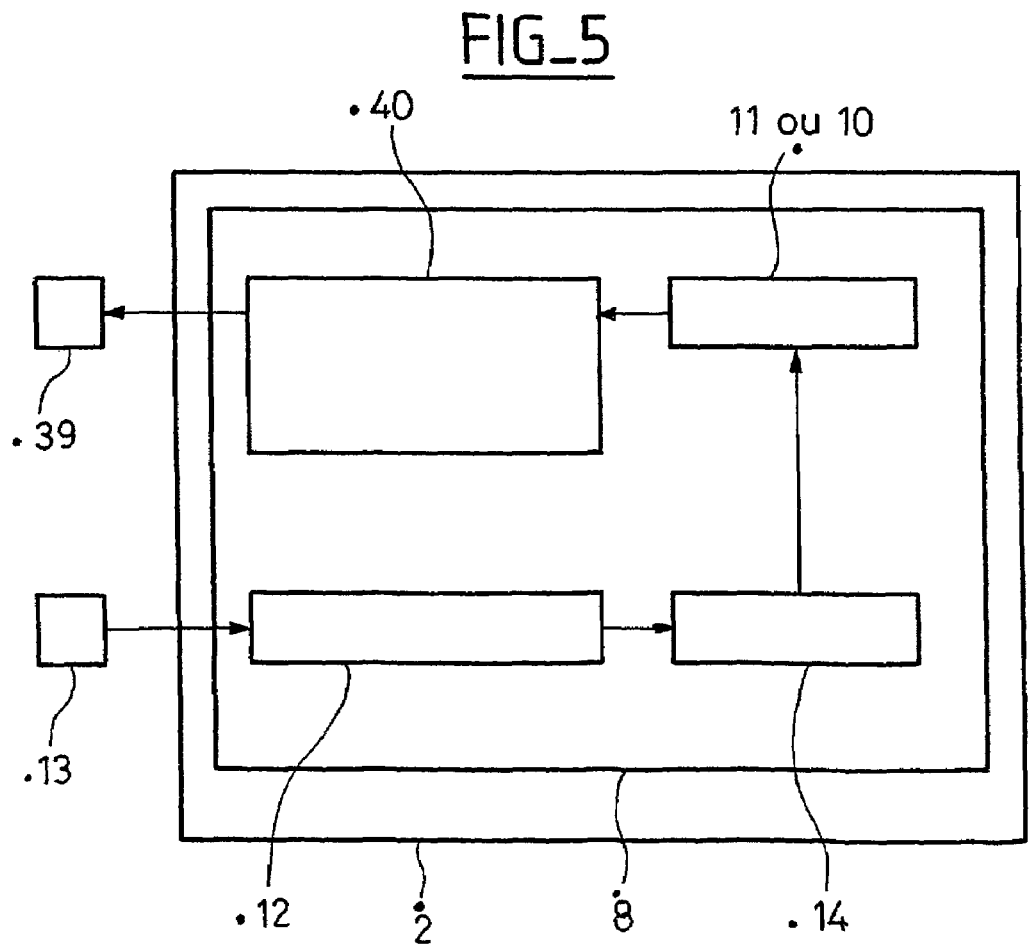

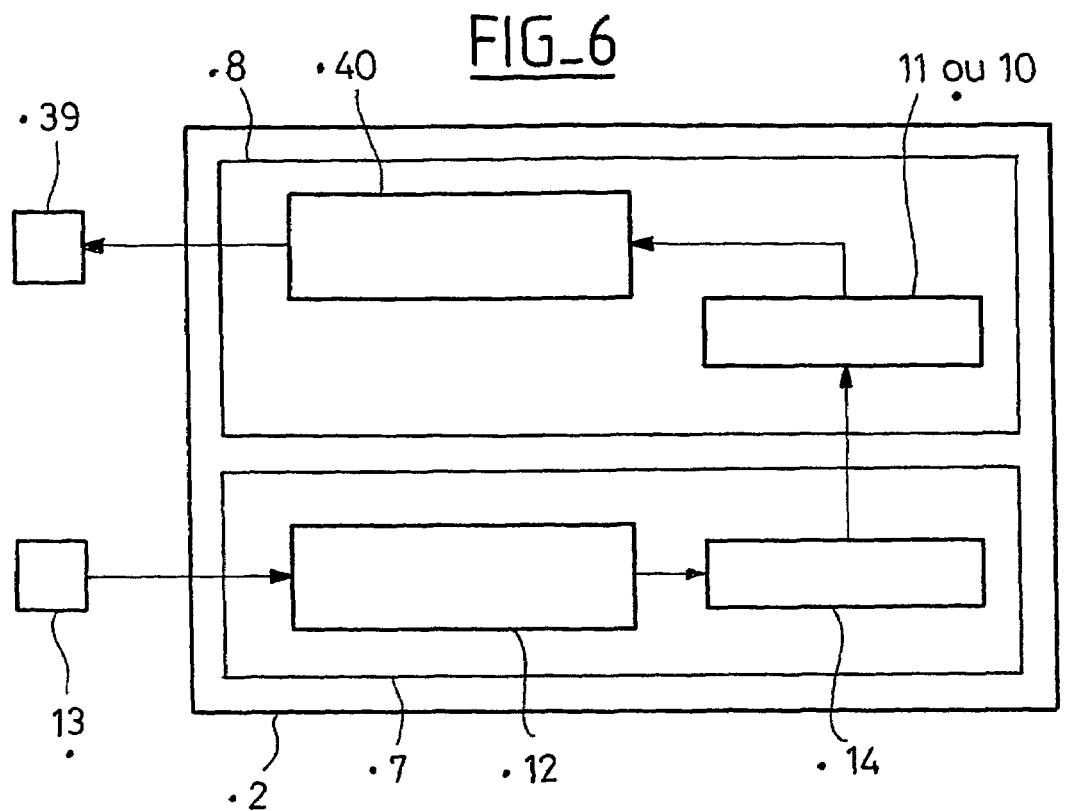
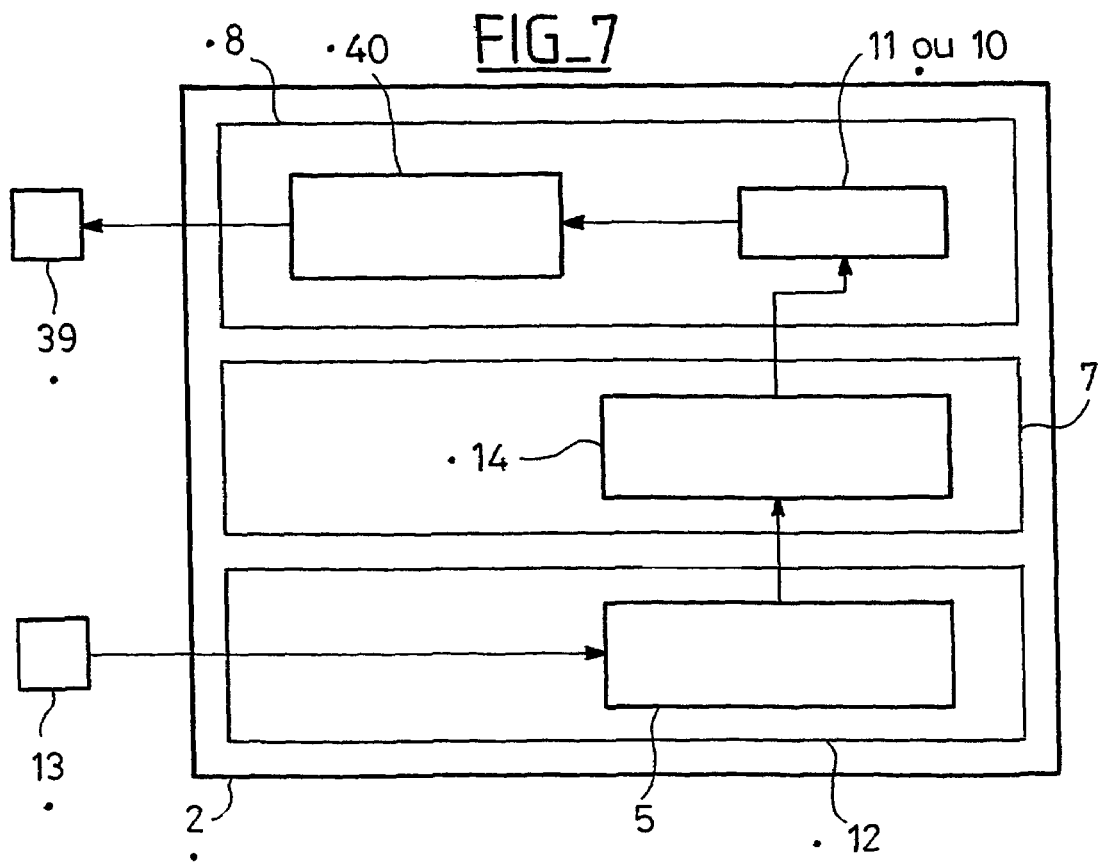

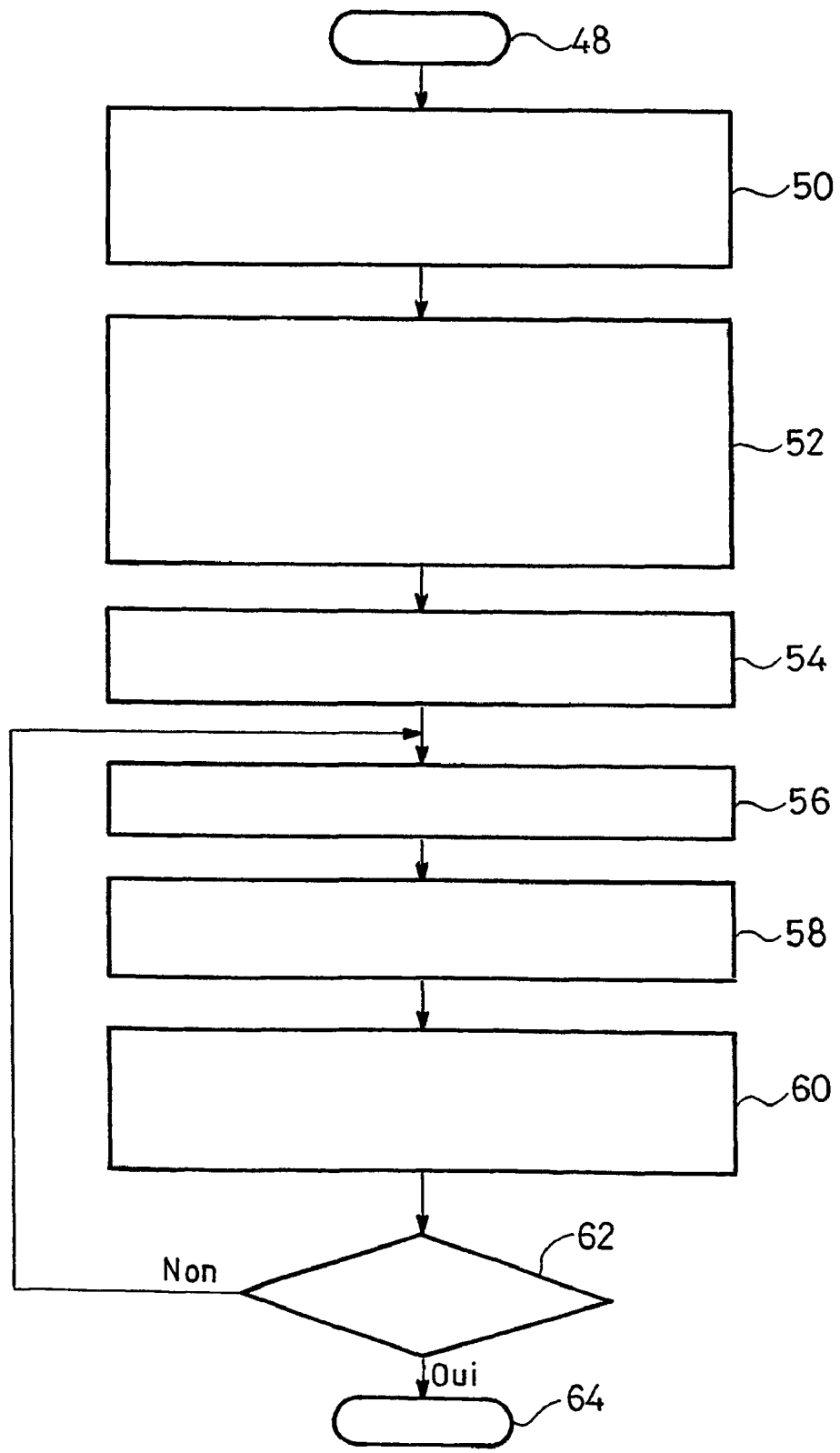

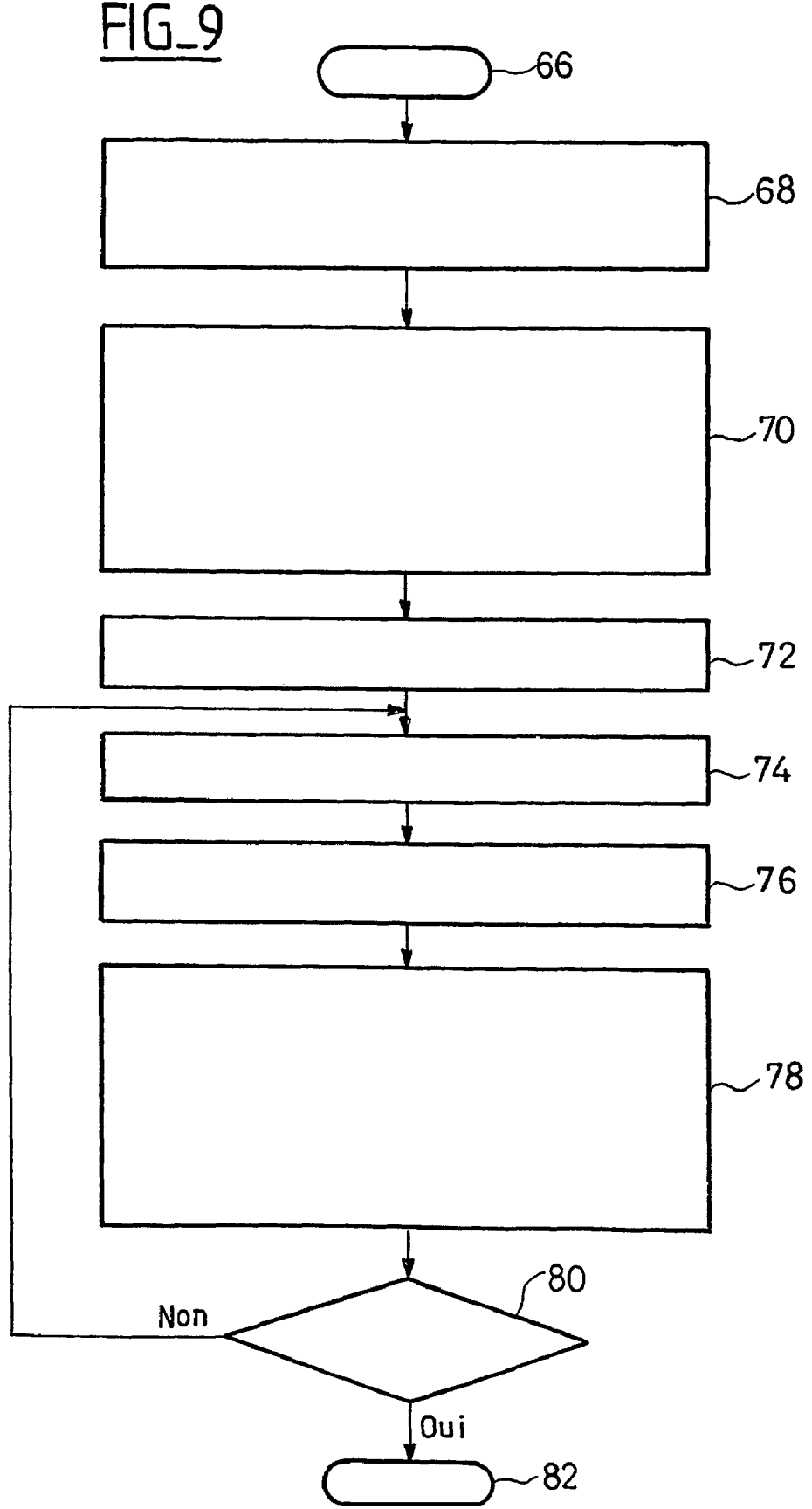

METHOD AND SYSTEM ENABLING REAL TIME MIXING OF SYNTHETIC IMAGES AND VIDEO IMAGES BY A USER

BACKGROUND OF THE INVENTION

1. Field of the Invention

The present invention concerns a method and a system permitting a user to mix synthetic images and video images in real time.

More precisely, the subject matter of the invention is a method and a system enabling a user:

(i) to produce in a data processing unit, composed of standard electronic circuits, a flow of synthetic images, and (ii) to trace a scene by creating visual interactions between the flow of synthetic images and at least one flow of video images.

The solution of this problem presented by the invention permits improving the quality of the scene and to shorten the processing time without employing proprietary and expensive data processing units.

2. Background

An equipment according to the prior art is represented in FIG. 1 which permits the achievement of the improved reality. This equipment includes:

a graphic work station STG,
a rack of the "chroma keyer" type RCK,
a rack of the "image delay" type RRI.

The legends C and SV indicate respectively a camera and a video output.

The graphic work station STG is used for the generation only of synthetic images. The graphic work statio STG is developed specifically or is a Silicon Graphics™ station. The synthetic images are generated on a uniform color background (key color).

The "chroma keyer" type rack RCK is used for mixing the video image from the camera (C) with the synthetic image generated by the graphic station STG. The key color is replaced by the video image.

The "image delay" type rack RRI is used to compensate for the processing time of the image generator.

Drawbacks of the prior technology:

Equipment of the prior art present problems in regard to price and image qualities and functionality.

Problems in regard to price:

The cost price of the equipment of the prior art is very high. In fact, the "image delay" rack RRI is a professional rack, the graphic station STG is a professional station. The previous solution according to the prior art is not carriable(it is made up of three separate modules: image generator/image delay/chroma key).

Problems in regard to image quality and functionality:

Visual interactivity between the video and the synthetic images is limited. In fact, at the output from the "chroma keyer" RCK the video is inserted in place of the key color. It is not possible to have reflections of the video on the synthetic images or vice versa. The video cannot be treated as a texture. For example, it cannot have reflection effects between the real images (video images) and the synthetic objects. The very principle of the "chroma key" can produce artefacts; it limits selection in the color palette of synthetic images, and makes the rendition of synthetic objects that have transparencies problematical.

The performance of specific graphic stations is quickly exceeded by the performance of consumer graphic boards which are ever more powerful (graphic power of consumer equipment is doubled about every six months).

The previous solution is expensive in terms of maintenance (the three units composing it involve a specific maintenance contract).

The previous solution cannot operate in a portable computer; it is not mobile.

The previous solution is constraining as regards time involved in adjusting all its parts.

On processing of the video image is possible:

the video cannot be used to texturize locally any element of the virtual scene, the video cannot be shaped (for example the correction of optical distortions is impossible), no processing can be performed on the video (for example, processing of the chroma key type).

SUMMARY AND OBJECTS OF THE PRESENT INVENTION

Process

The data processing unit according to the invention, particularly of the "PC computer" type, comprises:

a mother board
a graphic board for rendering and displaying the scene.

The meaning of scene in the sense of this invention is set forth below in connection with FIG. 2.

The graphic board for rendering and displaying the scene comprises a processor for accelerating 1D and 3D processings, a working buffer "back buffer" and a texture memory.

The data processing equipment also includes an acquisition means making it possible to acquire video images in real time in a video buffer. The acquisition means appears particularly in the form:

of a video acquisition integrated into the graphic board, and/or of a video acquisition integrated into the mother board, and/or of a video acquisition via a dedicated acquisition card (for example a Pinnacle™ card known by the name of PCTV).

The method according to the invention includes the step of performing a specific rendering of the scene, by copying the video buffer, upon each rendering of the scene, in a memory area of the graphic board, by tracing the synthetic images in the said working buffer of the graphic board.

According to a first variant embodiment of the invention, to carry out a specific rendering, preferably the method includes the following steps:

the step of copying the video buffer into the working buffer after each rendering of the scene, the step of tracing the synthetic images in the working buffer.

In the case of this first variant embodiment, when the video buffer includes interlaced video lines, to copy the video buffer, upon each rendering of the scene, into the working buffer, preferably the procedure includes:

the step of copying the even video lines, in a first rendering, then the step of copying the odd video lines, in the following rendering.

According to a second variant embodiment of the invention, to carry out a specific rendering the method includes, preferably, an initialization step prior to the specific rendering, consisting of creating a dedicated texture in the texture memory of the graphic board. The dedicated texture is of the size of the video buffer. The texture is dedicated for copying the video buffer into the texture memory.

In the case of this second variant embodiment, the method furthermore includes:
    the step of copying the video buffer into the dedicated texture,
    the step of completely retracing the scene, using the dedicated texture to texture some of the polygons of the scene.

In the case of this second variant embodiment, when the video buffer contains interlaced video lines, to copy the video buffer, upon each rendering of the scene, into the dedicated texture, preferably according to the invention the method comprises:
    the step of copying the even video lines in a first rendering, then
    the step of copying the odd video lines in the following rendering,
    the step of applying a translation of the video buffer of more or less one half-line to the rendering of the scene.

This translation of the video buffer is performed:
    either by modifying the texture coordinates of the dedicated texture,
    or by modifying the coordinates of the polygons textured by the dedicated texture.

The image quality is thus improved.

In the case of the first variant embodiment as in the case of the second variant embodiment, it is possible to copy the video buffer into the memory area of the graphic board by proceeding in two different ways.

In the case of a first way, the means of acquisition includes a driver having a new video buffer for each new video image. Preferably according to the invention, in the case of this first way, the rendering of the scene is performed in synchronism with the presentation of each new video buffer.

In the case of the second way, the acquisition means also includes a driver presenting a new video buffer for each new video image. However, in the case of this second manner of proceeding, preferably according to the invention the method comprises the following steps:
    the step of filling a buffer memory with each new video buffer by employing a unit of performance ("thread") of video capture,
    the step of copying one of the video buffers contained in the buffer memory to the texture memory of the graphic board,
    the step of performing the scene rendition asynchronously with respect to the presentation of each new video buffer.

The method according to the invention permits improved graphic functionality in the designing of a scene mixing a video image with a synthetic image.

Anti-Aliasing

Preferably, according to the invention, the method includes the step of applying an anti-aliasing function in the designing of the scene. The ideas of anti-aliasing function will be described below.

Transparency

Preferably, according to the invention, the method includes the step of applying a transparency function during the designing of the scene. The ideas of transparency function will be described below.

Correction of Optical Distortion

Preferably, according to the invention, the method includes the step of applying non-linear distortions to the video buffer by texturing the polygons of the scene by means of the dedicated texture.

It is thus possible to correct optical distortion of the video image.

Real-time Processing of Video Images

Preferably, according to the invention, the method includes the step of applying pixel shaders functions to the video buffer, permitting especially a chroma key type processing. The idea of pixel shaders and processing of the chroma key type will be described below.

Environment Mapping

Preferably, according to the invention, the data processing unit includes two means of acquisition, each having a video buffer. The method comprises the following steps:
    the step of copying the video buffer of one of the acquisition means into a second dedicated texture of the graphic board,
    the step of texturing at least a portion of the scene by using the second dedicated texture.

It is thus possible to obtain real reflections on the synthesis objects.

Video Delay

Preferably, according to the invention, the method includes the step of slowing the copy of one of the video buffers contained in a buffer memory toward the texture memory of the graphic board.

It is thus possible to delay the display of the video images with respect to the display of the synthetic images.

System

The invention likewise concerns a system enabling a user:
    (i) to produce in a data processing unit, composed of standard electronic circuits, a flow of synthetic images, and
    (ii) to design a scene, creating visual interaction between the synthetic image flow and at least one flow of video images.

The solution of this problem makes it possible to improve the quality of the scene and to reduce the processing time, without making use of proprietary and expensive data processing units.

The data processing unit according to the invention includes a processor, particularly of the common "PC" type. This processor comprises:
    a mother board
    a graphic board for rendering and displaying the scene.

The rendering and displaying graphic board contains a processor for accelerating 2D/3D processings, a working "back buffer" and a texture memory.

The data processing equipment includes an acquisition means allowing the acquisition in real time of video images in a video buffer. The acquisition means appears particularly in the form:
    of a video acquisition means integrated into the graphic board, and/or
    a video acquisition means integrated into the mother board, and/or
    a means of video acquisition via a dedicated acquisition card.

To perform a specific rendition of the scene:
    the mother board furthermore contains a data processing means making it possible, upon each rendition of the scene, to copy the video buffer into a memory zone of the graphic board,
    the 2D/3D processing accelerating processor includes tracing means for tracing designing the synthetic images in a memory area of the graphic board.

In a first variant embodiment, preferably according to the invention, to carry out a specific portrayal rendition of the scene:
    the data processing means comprise first copying means for copying, at each portrayal of the scene, the buffer video into the working buffer, the 2D/3D processing accelerating processor comprises first computing means for tracing the synthetic images into the working buffer.

In the case of this first variant embodiment, when the video buffer contains interlaced video lines, then preferably according to the invention, the first means for copying from the buffer video into the working buffer comprise:

first means for selecting and copying the even video lines, in a first rendition, then second means for selecting and copying the odd video lines in the following rendition.

In a second variant embodiment, to perform a specific rendition, preferably according to the invention, the data processing means comprise initialization means creating, prior to the specific rendition, a dedicated texture in the texture memory of the graphic board. The dedicated texture has the size of the video buffer. In the case of this second variant embodiment, the data processing means furthermore comprise second copying means for copying the video buffer into the dedicated texture, the 2D/3D processing acceleration processor comprises second computing means for completely tracing the scene, using the dedicated texture for texturing certain polygons of the scene.

In the case of this second variant embodiment, when the video buffer contains interlaced video lines, preferably according to the invention, the second means for copying from the video buffer into the dedicated texture comprise:

third selection and copying means for the even video lines in a first rendition, then fourth selection and copying means for the odd video lines in the following rendition.

The 2D/3D processing acceleration processor comprises third computation means in order to apply a translation from the video buffer of more or less one half-line in the rendition of the scene.

This translation from the video buffer is performed:

either by modifying the texture coordinates of the dedicated texture, or by modifying the coordinates of the polygons textured by the dedicated texture.

Thus the image quality is improved.

In the case of the first variant embodiment, as in the case of the second variant embodiment, it is possible to copy the video buffer in two different ways:

In the case of the first way of proceeding, the acquisition means comprises a driver having a new video buffer for each new video image. Preferably, according to the invention, in the case of this first way of proceeding, the data processing means perform the rendition of the scene in synchronism with the presentation of each new video buffer.

In the case of a second way of proceeding, the acquisition means comprises a driver having a new video buffer for each new video image. Preferably, according to the invention, in the case of this second way of proceeding, the said data processing means comprise:

transfer means for filling a buffer memory with each new video buffer, using a video capture performance unit ("thread"), third copying means for copying a video buffer contained in the said buffer memory to the texture memory of the graphic board.

The data processing means perform the rendering of the said scene out of synchronism with respect to the presentation of each new video buffer.

The system according to the invention permits graphic functionalities when a scene is being scanned by mixing a video image with a synthesis image.

Anti-Aliasing

Preferably, according to the invention, the data processing means make it possible to apply an anti-aliasing during the designing of the scene.

Transparency

Preferably, according to the invention, the data processing means permit applying a transparency function during the scanning of the scene.

Correction of Optical Distortion

Preferably, according to the invention, the data processing means permit applying non-linear distortion to the video buffer by texturing polygons of the scene by means of the dedicated texture.

It is thus possible to correct optical distortions of the video image.

Real-Time Processing of Video Images

Preferably, according to the invention, the data processing means permit applying pixel shader functions, permitting in particular a processing of the chroma key type.

Environment Mapping

Preferably, according to the invention, the data processing unit includes two acquisition means each having a video buffer. The data processing means permit copying the video buffer of one of the acquisition means into a second dedicated texture of the graphic board.

The 2D/3D processing accelerating processor permits texturing at least a portion of the scene by using the second dedicated texture.

It is thus possible to obtain real reflections on the synthetic objects.

Video Delay

Preferably, according to the invention, the data processing means permit slowing the copy of one of the video buffers contained in a buffer memory toward the texture memory of the graphic board.

It is thus possible to delay the display of the video images with respect to the display of the synthetic images.

BRIEF DESCRIPTION OF THE DRAWINGS

Other characteristics and advantages of the invention will appear from reading the description of a variant embodiment of the invention, given by way of suggestive but not limiting example, and of FIG. 1 representing equipment of the prior art making it possible to make improvements to reality FIG. 2 representing an overall plan of a variant embodiment of a system according to the invention, FIG. 3 schematically showing the data processing means 26 in the case of another Variant embodiment, FIG. 4 representing schematically the 2D/3D processing acceleration processor 9 in the case of the variant embodiment shown in FIG. 3, FIG. 5 representing schematically a variant embodiment in the case in which the acquisition means 12 appears in the form of a video acquisition integrated into the graphic board 8, FIG. 6 representing schematically a variant embodiment in the case where the acquisition means 12 is in the form of a video acquisition integrated into the motherboard 7, FIG. 7 schematically representing a variant embodiment in a case where the acquisition means 12 appears in the form of a video acquisition by way of a dedicated acquisition card, FIG. 8 schematically representing the copy algorithm of the video buffer 14 in the video output buffer (back buffer) 40 of the graphic board, FIG. 9 schematically representing the copy algorithm of the video buffer 14 in the texture memory 11 of the graphic board.

DETAILED DESCRIPTION OF THE EMBODIMENTS

FIG. 1 has been described above in the presentation of the prior art. Now FIG. 2 will be described, which represents an overall plan of a variant embodiment of a system according to the invention.

In FIG. 2 there is represented a data processing unit 2 comprising:
- a graphic board 8,
- a motherboard 7
- acquisition means 12 receiving a flow 5 of video images 13,
- a hard disk 42 containing a scene 4.

The graphic board 8 comprises:
- a 2D/3D processing acceleration processor 9 comprising first computing means 29,
- a work buffer 10 receiving the flow 3 of synthetic images 16 from the 2D/3D processing acceleration processor 9,
- a texture memory 11 comprising a dedicated texture 19,
- a video output 39,
- a video output buffer (back buffer) 40.

The motherboard 7 comprises:
- data processing means 26 comprising first copy means 27 containing first selection and copy means 30, [and] second selection and copy means 31,
- a central memory 41 containing a scene 4 and polygons 20,
- a buffer memory 23 comprising video buffers 14 containing even video lines 17 and odd video lines 18,
- a driver 22,
- an execution unit 24.

In another variant embodiment, the data processing means 26 include initialization means 32, second copy means 33 comprising the third means of selection and copy 35, [and] fourth selection and copy means 35 (see FIG. 3). In the case of this variant embodiment, the 2D/3D processing acceleration processor 9 includes second computing means 34 (see FIG. 4), The acquisition means 12 numbers the video signal 13 corresponding to the video images of the flow 5 (the video signal can be in the analog or numerical standard). The motherboard receives this numbered flow in a video buffer 14 composed of pixels and stored in its memory. In the description, the video buffer 14 is also called the pixel buffer.

A 3D scene 4 is a combination of elements:
- 3D objects composed of textures (2D image) and polygons 20 (3D geometry).
- Light sources
- Virtual cameras.

The 3D scene 4 is stored on the hard disk 42 and is recopied into the central memory 41 of the motherboard 3.

To calculate a synthesis image 16, the motherboard 7 copies the video buffer 14 and the textures of the 3D scene in the texture memory 11 of the graphic board 8 and sends to the latter all of the polygons 20 to be displayed, the light sources, [and] the camera. The specialized circuits (the 2D/3D processing accelerating processors 9) compute from these 3D data an image 2D in the work buffer 10 (back buffer). The content of the work buffer 10 is then transferred into the video output buffer 40 (front buffer) and the video output 39 to be used by the display device (television, monitor, projector) to display the image.

The video buffer 14 is recopied into the dedicated texture 19 of the texture memory 11. Since the dedicated texture 19 is part of the scene, it is possible to display its content according to the needs of the user. The following displays are mentioned as non-restrictive examples:
- display of the dedicated texture 19 in the background to obtain a "full screen" video.
- display of the dedicated texture 19 on a synthetic object included in the scene 4 to enrich the latter with a video in real time.

Texturization is a technique that consists in drawing a polygon 20 in 3D with a texture (2D image) superimposed. For this purpose, each apex 3D is assigned a polygon 20 of 3D coordinates (texture coordinates) in the texture. It is possible to use several textures on the same polygon 20. A set of texture coordinates for each texture is associated with the apexes.

The texturization can be done with any type of 2D image, and therefore with the video buffer 14 which is a 2D image. A set of polygons 20, texturized with the video buffer 14, is treated like any object involved in the computing of the synthetic image 16.

A description will now be given of FIG. 5 schematically represented a variant embodiment in a case where the acquisition means 12 appears in the form of a video acquisition integrated into the graphic board 8.

The data processing unit 2 contains a graphic board 8 equipped with an acquisition means 12. The video image 13 is acquired in real time by the acquisition means 12 and then recopied into the video buffer 14. The video buffer 14 is then recopied in two possible ways:
- either to the work buffer 10,
- or to the texture memory 11.

After this copy, the 2D/3D processing acceleration processor 9 performs a rendering of the scene 4 in the work buffer 10. The work buffer 10 is transferred into the video output buffer 40 which makes it possible to update the video output 39.

Now a description will be given of FIG. 6 which represents schematically a variant embodiment in a case where the acquisition means 12 appears in the form of a video acquisition integrated into the motherboard 7.

The data processing unit 2 contains a motherboard 7 equipped with an acquisition means 12. The data processing unit 2 likewise contains a graphic board 8. The video image 13 is acquired in real time by the acquisition means 12, then recopied into the video buffer 14. The video buffer 14 is then recopied in two possible ways:
- either to the work buffer 10,
- or to the texture memory 11.

After this copy, the 2D/3D processing acceleration processor 9 performs a rendering of the scene 4 in the work buffer 10. The work buffer 10 is transferred to the video output buffer 40 permitting the updating of the video output 39.

A description will now be given of FIG. 7 which represents schematically a variant embodiment in the case where the acquisition means 12 appears in the form of a video acquisition via a dedicated acquisition card.

The data processing unit 2 contains an acquisition means 12 in the form of an acquisition card connected to the motherboard 7 (for example, a Pinnacle™ PCTV card. The data processing unit 2 likewise contains a graphic board 8. The video image 13 is acquired in real time by the acquisition means 12, then recopied into the video buffer 14. The video buffer 14 is then recopied in two possible ways:

either to the work buffer 10, or to the texture memory 11.

After this copy the 2D/3D processing accelerating processor 9 of the graphic board performs a rendering of the scene 4 in the work buffer 10. The work buffer 10 is transferred into the video output buffer 40 permitting the updating of the video output 39.

A description will now be given of FIG. 8 which schematically represents in block form the copying of the video buffer 14 into the video output buffer (back buffer) 40 of the graphic board. The blocks have the following meaning:

Block 48:
START
Block 50:
Initialization of the acquisition means 12:
Change to acquisition mode.
Definition of the video input (e.g.: Svideo/PAL/NTSC
Starting of the video acquisition.
Block 52:
Initialization of the 2D/3D processing acceleration processor 9:
Definition of the type of output (e.g.: VGA or PAL or NTSC or DVI).
Definition of graphic mode (full screen or window).
Definition of the graphic resolution (e.g.: 800 by 600 at 32 bits per pixel).
Definitial of the mode Z buffer (init. of 3D acceleration).
Change to double buffer mode (creation of video output 40 and work buffer 10).
Block 54:
Change of scene 4:
Loading of all 3D models from the hard disk 42.
Block 56:
RAZ of the Zbuffer.
RAZ of the work buffer 10 (optional).
Block 58:
Copying of video buffer 14 coming from the acquisition means 12 into the work buffer 10.
Block 60:
Tracing of scene 4 into the work buffer 10 performed by the 2D/3C processing acceleration processor 9.
Updating of video output buffer 40
Block 62:
End program?
Block 64:
THE END.

A description will now be given of FIG. 9 schematically representing in block form the copy algorithm of the video buffer 14 into the texture memory 11 of the graphic board.

The blocks have the following meaning:
Block 66:
START
Block 68:
Initialization of the acquisition means 12:
Change to acquisition mode
Definition of video input (e.g.: Svideo/PAL/NTSC)
Block 70:
Initialization of the 2D/3D processing acceleration processor 9,
Definition of type of output (e.g.: VGA or Pal or NTSC or DVI).
Definition of the graphic mode (full screen or window).
Definition of the graphic resolution (e.g.: 800 by 600 at 32 bits per pixel)
Definition of the Zbuffer mode (init. 3D acceleration).

Shift to double buffer mode (creation of the video output buffer 40 and work buffer 10).
Initialization of the dedicated texture (creation of the dedicated texture 19 in the texture memory 11, the dedicated texture 19 at the same number of lines and columns as the video capture buffer video 14)
Block 72:
Loading of scene 4
Loading of all 3D models from the hard drive 42.
Block 74:
RAZ of the Zbuffer.
RAZ of the work buffer (10) (optional).
Block 76:
Copy of the video buffer 14 from the acquisition means 12 in the dedicated texture 19 included the texture memory 11.
Block 78:
Tracing of scene 4 into the working buffer 10
Utilization of textures, including those that can be made of a texture (e.g., environment mapping, traced internal combustion engine he work buffer 10 as screen background, texturization of synthetic objects).
Updating of the video output buffer 40.
Block 80:
End of program?
Block 82:
END.

Description of the anti-aliasing:

Anti-aliasing is the filtering operation that permits reduction of the stair-steps on the edges of the polygons 20 due to the finite resolution of the synthetic image 16.

When anti-aliasing is applied, the color of the pixels on the edges of the object in the foreground is obtained by an operation of filtering between the pixels of the background objects and the pixels of the object in the foreground.

The invention makes it possible to treat a textured object with the video as an element of the same nature as the other synthetic objects: the anti-aliasing functions therefore are applied in tracing the entire scene.

Description of Transparency Effects

The synthetic objects can contain transparent surfaces. If such an object is in the foreground in relation to a background object textured with a video, the texured video object will be seen through these surfaces.

Description of Non-Linear Distortion:

The method permits the application of non-linear distortion to the video, since the latter is stored in a texture mapped on polygons 20. It is thus possible to distort the video image in real time to correct the optical distortions of the video camera. The lines at the edges of the image that appear to be curved can thus be straightened by pulling the video texture.

For this purpose a regular mesh of polygons 20 is created on which a video texture is plated with texture coordinates describing a curve when the coordinates of the associated vertices evolve linearly.

Description of "pixel shader" Processings,

Particularly on the "Chroma Key."

The final color of a pixel is a combination between the color of this same pixel for the polygon 20 being traced and the color for the polygons 20 already traced. The color of a pixel of a polygon is a combination between the value of this pixel in the texture or textures associated with these polygons and the illumination of the polygon.

The present-day graphic boards use a program (pixel shader) to perform this combination. This program is transferred into the graphic board 8 like the other 3D objects.

The method of the invention pen-nits applying functions, known in themselves, of the "pixel shader" type, to the video image. This makes it possible particularly to employ algorithms of the "chroma-key" type on the video buffer 14, or other image processings.

The principle of the chroma key consists in replacing in an image all the points of a given color with points from another video source. Sometimes this technique is called "blue screen." A description is provided below of a simple chroma-key algorithm. For each pixel of the video:

its color is entered in the space YUV, the distance of this color is calculated in relation to a reference color, ignoring the coordinate Y (the luminance), if the distance is less than a predetermined threshold the pixel is made transparent; otherwise it is displayed normally.

Description of Environment Mapping

Environment mapping is a technique that simulates reflective surfaces without using ray tracing (unusable in real time). The technique applies a special texture containing an image of the scene surrounding the object on the object itself. The result obtained is an approximation of the appearance of a reflective surface, without requiring too much computing power.

The method of the invention, generalized to the use of two acquisition means 12 (two acquisition cards) permits using one of the two acquisition means 12 (one of the two acquisition cards) to copy the buffer video 14 associated with this card in the memory of a texture 11 which will serve as a mapping of the environment when objects of the texturized scene are traced with this texture. This particularly permits obtaining real reflections on these synthetic objects.

The other acquisition card is used to copy its video buffer 14 to the memory of a texture displayed in the background of the synthetic objects on which there are reflections.

Description of a Buffer Memory 23

The buffer memory method permits slowing the display of the video images.

N video images are stored in memory.

The buffer memory method permits slowing the display of video images. The buffer memory 23 operates on the following principle: the buffer memory 23 can store N video buffers 14. These video buffers 14 correspond to the video images 13 acquired by the acquisition means 12 during the cycles N, (N-2), (N-2), (N-3), etc . . . In cycle N, the method can decide to use the video buffer 14 acquired at the cycle (N-2), which in this case results in a slowing of the video images displayed by the video output 39 by 3 cycles. Generally, by this process, up to N delayed images can be introduced.

Advantages of the Claimed Solution over the Prior Art

Now the advantages of the method and system of the invention over the prior art will be explained:

The method and the system of the invention permit an improvement of the quality of the images: number of polygons, shadowing, texturizing, transparency, reflections and anti-aliasing.

The method and the system of the invention make it possible to achieve in real time the effects of video texturization, that is, the texturization of synthetic objects, not with a single static image, but with a live video.

The method and the system of the invention make it possible to achieve dynamic environment mapping effects, that is, the possibility of surrounding the synthetic objects with an environment map that is not static but is the video itself. This opens the door to surprising effects, particularly when the synthetic objects have as reflective a surface as a mirror.

The method and the system of the invention permit achieving everything that is possible to do classically with static textures, but now with one or several live video sources.

The method and the system of the invention permit carrying out a video image processing by the technology of pixel shaders (particularly processing of the chroma key type).

The method and the system of the invention permit slowing video images without an external rack.

The method and the system of the invention permit a reduction of the system's response time since all of the processings are internal in the same machine (the processing times of several processing units do not accumulate as internal combustion engine he prior art).

The method and the system of the invention permit the use of materials produced in large quantity at low cost.

The method and the system of the invention do not require electronic proprietary developments (hardware): they permit ease of maintenance (mother boards of the generally available PC, consumer graphic boards, consumer video acquisition cards).

The method and the system of the invention can work with a single computer (standard PC case), portable computer, or industrial rack PC).

The method and the system of the invention can operate in real time: the video images are generated directly. It is thus possible to eliminate the post-production costs (no time of several hours spent for a few seconds of video images).

The method and the system of the invention can be shipped. The method and the system can operate on compact industrial PC boards (military or naval or dangerous areas).

The method and the system of the invention can operate on hardened material (for industry, military).

The method and the system of the invention can follow the development of performances of accelerating graphic boards with the minor task of updating the software: use of standard graphic libraries (DirectX or Open The method and the system of the invention can easily be moved (mobility) and quickly installed where it will be used.

The method and the system of the invention can run on a portable computer equipped with a video input (e.g.: DV input).

Industrial and commercial applications of the method and system according to the invention.

Industrial applications internal combustion engine he audiovisual field (motion pictures and video).

The method and the system of the invention can particularly be used for audiovisual productions shot on line or under on-line conditions:

virtual sets in real time (display of presenters in virtual settings).

special effects in real time (e.g., particles, explosions, distortions in real time)

The method and the system of the invention can be used especially in the advertising field (e.g., virtual products in real settings).

The method and the system of the invention can be used in order to overlay virtual objects in a telecast and to create interaction with a live presenter (talkshows, sporting events, television sales, news, weather forecasts, medical broadcasts).

The method and the system of the invention can be used in doing "avatars," virtual personalities in real settings in real time.

The method and the system of the invention can be used in making real-time visualizations for motion pictures (control of special effects at the site of the shooting).

INDUSTRIAL APPLICATIONS IN THE INDUSTRIAL FIELD

The method and the system of the invention can be used in the manufacturing field (enrichment with real images to guide manual operations and inform the manufacturer during production).

The method and the system of the invention can be used in the maintenance field (enrichment with real images with supplemental information to optimize maintenance schedules, real-time guide for emergency repairs).

The method and the system of the invention can be used internal combustion engine the military (virtual targets, virtual threats, explosions, infantry, vehicles).

The method and the system of the invention can be used in simulations (simulated atmospheric or environmental phenomena mixed with real props, testing of virtual prototypes, virtual vehicles).

The method and the system of the invention can be used in the field of video games (real players visualized in a video game, or virtual elements such as persons, vehicles integrated into real images).

The method and the system of the invention can be used:
in the automotive field (virtual vehicles on real roads).
in the field of architecture (visualization of virtual buildings in real landscapes).
in the field of real-time driving: display of data to direct a pilot or a conductor.

Applications in the Marketing or Communication Field

The method and the system of the invention can be used in conducting market studies: display of products not yet actually made, in real situations (e.g.: new mobile GSM, new vehicle).

The method and the system of the invention can be used to make interactive images in shops or business centers.

Industrial applications in the field of information technology.

The method and the system of the invention can be used in video conferences: visiophone with possibility of inserting and interacting with virtual objects.

INDUSTRIAL APPLICATIONS IN THE LEISURE FIELD

The method and the system of the invention can be used in amusement parks: visual animations in real time (e.g.: interactive mirrors).

The invention claimed is:

1. A method for enabling real-time mixing of synthetic images and video images by a user, comprising the steps of:
producing a flow of synthetic images by combining three-dimensional geometric shapes with textures of two-dimensional images using a data processing unit comprising a motherboard; a graphic board for rendering and displaying a scene, and comprising a 2D/3D processing acceleration processor, and a memory zone comprising a work buffer and a texture memory; and acquisition means for acquiring, in real time. video images in a video buffer; and tracing said scene by creating visual interactions between said flow of synthetic images and at least a flow of video images; and performing a specific rendition of said scene by copying, upon each rendering of said scene, said video buffer into said memory zone of said graphic board; and tracing said synthetic images into said memory zone of the graphic board, thereby improving the quality of said scene and reducing the processing time without employing expensive proprietary data processing units.

2. The method of claim 1, wherein the step of performing comprises the steps of:
copying, upon each rendering of said scene, said video buffer into the said work buffer; and
tracing said synthetic images into said work buffer.

3. The method of claim 2, wherein said video buffer comprises interlaced video lines; and further comprising the steps of:
copying even video lines of said video buffer, upon a first rendition of said scene, into said work buffer; and
copying odd video lines of said video buffer, upon the following rendition of said scene, into said work buffer.

4. The method according of claim 1, further comprising the steps of:
initializing prior to the specific rendition by providing a dedicated texture in said texture memory of said graphic board, wherein said dedicated texture has the size of said video buffer and is dedicated to copying said video buffer into said texture memory; and
copying said video buffer into said dedicated texture and tracing said scene completely, using said dedicated texture to texture some of polygons of the said scene.

5. The method of claim 4, wherein said video buffer comprises interlaced video lines; and further comprising the steps of:
copying even video lines of said video buffer, at the time of a first rendering of said scene, into said dedicated texture; and
copying odd video lines of said video buffer, at the time of the following rendition of said scene, into said dedicated texture; and
applying a translation from said video buffer of about one half video line into the rendition of said scene either by modifying texture coordinates of said dedicated texture or the coordinates of the polygons textured by said dedicated texture, thereby improving the image quality.

6. The method of claim 1, wherein said acquisition means comprises a driver having a new video buffer for each new video image; and wherein the step of performing renders said scene in synch with presentation of each new video buffer.

7. The method of claim 1, wherein said acquisition means comprises a driver having a new video buffer for each new video image; and further comprising the steps of:
filling a buffer memory with each new video buffer, employing a video capture performance unit;
copying one of the new video buffers contained in said buffer memory into said texture memory of said graphic board; and
asynchronously performing the rendition of the said scene in relation to presentation of each new video buffer.

8. The method of claim 1, further comprising the step of applying an anti-aliasing function in the tracing of said scene.

9. The method of claim 1, further comprising the step of applying a transparency function in the tracing of said scene.

10. The method of claim 1, further comprising the step of applying non-linear distortions to said video image in said video buffer when texturing polygons of said scene using a dedicated texture, thereby correcting optical distortions of the video image.

11. The method of claim 1, further comprising the step of applying pixel shader functions to said video buffer, thereby permitting the processing of chroma key type.

12. The method of claim 4, the said data processing unit comprising one or more acquisition means, each having a video buffer; and further comprising the steps of:
copying the video buffer of one of said acquisition means into a second dedicated texture of said graphic board; and
texturing at least in part said scene using said second dedicated texture, thereby obtaining real reflections on synthetic objects.

13. The method of claim 7, further comprising the step of slowing the copying of one of the video buffers contained in a buffer memory into the said texture memory of said graphic board, thereby slowing the display of video images with respect to the display of the synthetic images.

14. System for enabling real-time mixing of synthetic images and video images by a user, comprising:
a data processing unit for producing a flow of synthetic images by combining three-dimensional geometric shapes with textures of two-dimensional images and tracing a scene by creating visual interactions between said flow of synthetic images and at least a how of video images, said data processing unit comprising:
a motherboard comprising a data processor;
a graphic board for rendering and displaying said scene;
wherein said graphic board comprises a 2D/3D processing acceleration processor comprising a tracing device, and a memory zone comprising a work buffer and a texture memory; and
an acquisition device for acquiring, in real time, video images in a video buffer; and
wherein said data processing means is operable to perform a specific rendition of said scene;
wherein said data processor is operable to copy, upon each rendition of said scene, said video buffer into said memory zone of said graphic board; and
wherein said tracing device is operable to trace said synthetic images into said memory zone of the graphic board, thereby improving the quality of said scene and reducing the processing time without employing expensive proprietary data processing units.

15. The system of claim 14, wherein said data processing means comprises first copying device for copying, upon each rendition of said scene, said video buffer into said work buffer; and wherein said 2D/3D) processing acceleration processor comprises a first computing device for tracing said synthetic images into the said work buffer.

16. The system of claim 15, wherein said video buffer comprises interlaced video lines; and wherein said first copying device comprises a first selection device for selecting and copying even video lines of said video buffer at the time of the first rendering, and a second selection device for selecting and copying odd video lines of said video buffer at the time of the next rendering.

17. The system of claim 14, wherein said data processing means comprises:
a texture device for providing, prior to the specific rendition, a dedicated texture in said texture memory of said graphic board, said dedicated texture having the size of the said video buffer; and
second copying device for copying said video buffer into said dedicated texture to carry out a specific rendition; and
wherein said 2D/3D processing accelerating processor comprises a second computing device for completely tracing said scene using said dedicated texture to texture polygons of said scene.

18. The system of claim 17, wherein said video buffer comprises interlaced video lines; wherein said second copy means comprises:
a third selection device for selecting and copying said even video lines in a first rendition;
a fourth selection device for selecting and copying said odd video lines in the following rendition;
a computing device for applying a translation from said video buffer of about one half video line in the rendition of said scene either by modifying texture coordinates of said dedicated texture or the coordinates of polygons textured by said dedicated texture, thereby improving the image quality.

19. The system of claim 14, wherein said acquisition device comprises a driver having a new video buffer for each new video image; and wherein said data processor synchronously performs the rendition of said scene with presentation of each new video buffer.

20. The system of claim 14, wherein said acquisition device comprises a driver presenting a new video buffer for each new video image; and wherein said data processor comprising:
a transfer device for filling a buffer memory with each new video buffer, employing a unit of execution or thread of video capture, and
a third copying device for copying one of the video buffer contained in said buffer memory into said texture memory of graphic board; and
wherein said data processor is operable to asynchronously perform the rendition of said scene with respect to the presentation of each new video buffer 21. The system of claim 14, wherein said data processor is operable to apply an ariti-aliasing function when said scene is being traced.

22. The system of claim 14, wherein said data processor is operable to apply a transparency function when said scene is being traced.

23. The system of claim 14, wherein said data processor is operable to apply non-linear distortion, to said video image in said video buffer when texturing polygons of said scene using a dedicated texture, thereby correcting optical distortions of the video image.

24. The system of claim 14, wherein said data processor is operable to apply pixel shader functions to said video buffer, thereby permitting the processing of the chroma key type.

25. The system of claim 14, wherein said data processing unit comprises one or more acquisition devices; wherein said data processor is operable to copy said video buffer from one of said acquisition devices into a second dedicated texture of said graphic board, and wherein said 2D/3D processing acceleration processor is operable to texturize said scene at least in part by using said second dedicated texture, thereby obtaining real refleclions on synthetic objects.

26. The system of claim 14, wherein said data processor as operable to slow the copy of one of said video buffers contained in a buffer memory into said texture memory of said graphic board (8), thereby slowing the display of the video images with respect to the display of the synthetic images.

* * * * *